(12) United States Patent  
Naber et al.

(10) Patent No.: US 6,675,445 B2
(45) Date of Patent: Jan. 13, 2004

(54) METHOD AND DEVICE FOR PRODUCING A MINERAL WOOL NONWOVEN FABRIC

(75) Inventors: Wilfried Naber, Wesel (DE); Ludwig Schorr, Trippstadt (DE)

(73) Assignee: Pfleiderer Dammstofftechnik International GmbH & Co., Wesel (DE)

( * ) Notice: Subject to any disclaimer, the term of this patent is extended or adjusted under 35 U.S.C. 154(b) by 256 days.

(21) Appl. No.: 09/775,831

(22) Filed: Feb. 5, 2001

(65) Prior Publication Data

US 2001/0019767 A1 Sep. 6, 2001

Related U.S. Application Data

(63) Continuation of application No. PCT/EP99/05626, filed on Aug. 3, 1999.

(30) Foreign Application Priority Data

Aug. 3, 1998 (DE) ......................................... 198 34 963

(51) Int. Cl.[7] ............................................. D01G 25/00
(52) U.S. Cl. .......................................... 19/296; 19/304
(58) Field of Search ....................... 19/296, 302, 65 A, 19/144, 299, 304, 160, 161.1, 163; 65/505, 516, 518, 453; 156/242, 244.11, 245, 324; 271/225, 184, 185; 367/137; 442/327, 373, 392, 400, 401

(56) References Cited

U.S. PATENT DOCUMENTS

| 2,206,058 | A | * | 7/1940 | Slayter et al. ................. 65/464 |
| 3,493,452 | A | * | 2/1970 | Cole ........................... 156/254 |
| 3,824,086 | A | | 7/1974 | Perry et al. |
| 4,201,247 | A | * | 5/1980 | Shannon ....................... 138/141 |
| 4,280,253 | A | * | 7/1981 | Holt .............................. 19/296 |
| 4,463,048 | A | | 7/1984 | Dickson et al. |
| 4,917,750 | A | | 4/1990 | Klose |
| 5,056,195 | A | * | 10/1991 | Furtak et al. .................. 19/304 |
| 5,065,478 | A | * | 11/1991 | Furtak et al. .................. 19/296 |
| 5,268,015 | A | * | 12/1993 | Furtak et al. .................. 65/447 |
| 5,624,742 | A | * | 4/1997 | Babbitt et al. ............... 428/212 |

FOREIGN PATENT DOCUMENTS

DE          39 21 399          1/1991

* cited by examiner

*Primary Examiner*—Gary L. Welch
(74) *Attorney, Agent, or Firm*—Young & Thompson

(57) ABSTRACT

A device for producing a mineral wool nonwoven fabric, comprising a drop shaft and fibrillation devices in addition to a conveyor device for the conveyance of mineral wool nonwoven fabric. A device is also provided to separate the strip of insulating material into a first section and a second section in a longitudinal direction. A conveyor device directs the first section in such a way that it is placed on the second section. The device enables a mineral fiber product to be created with a density distribution that is such that the upper area and the lower area have a higher density than the area located inbetween.

18 Claims, 6 Drawing Sheets a)

b)

METHOD AND DEVICE FOR PRODUCING A MINERAL WOOL NONWOVEN FABRIC

BACKGROUND OF THE INVENTION

1. Field of the Invention

The invention relates to an apparatus for producing a mineral wool nonwoven fabric including a shroud comprising fiberizing means and a conveyor means for transporting the mineral wool nonwoven fabric, as well as to a method for producing mineral wool nonwoven fabric. The invention relates furthermore to a mineral fiber product having a defined density distribution across the thickness.

2. Prior Art

The intention in producing mineral wool nonwoven fabric is obtain a product of best possible quality for the least amount of energy required. In mineral wool nonwoven fabric production the raw materials are fed molten to a fiberizing means which generates the mineral wool fibers. The mineral wool fibers are discharged into a shroud and deposited on the conveyor means. The bottom conveyor means is usually an air-permeable circulating transport belt. Located under the transport belt is a suction device for generating a specific vacuum.

Since the fiberizing means typically employed in this field convey the vitreous fibers emerging centrifugally from a body in high-speed rotation by a strong downflow of air, a considerable proportion of the air flow is blown into the shroud. This air flow impinges the conveyor means arranged at the bottom of the shroud and is deflected upwards thereby in a zone of high turbulence, resulting in return flow within the shroud. It is this return flow that tends to return upwards the mineral wool fibers already deposited on the conveyor means. To counteract this effect a high-power suction blower needs to be provided so that the mineral wool fibers deposited on the conveyor means are held in place by an adequate vacuum. This vacuum needs to be sufficient so that also in the case of thick mineral wool layers on the conveyor means the topmost layers still remain in place.

When it is desired to produce a relatively thick mineral wool nonwoven fabric several fiberizing means are arranged in a shroud in the conveying direction of the conveyor means. This, however, increases the energy consumption of the suction device since the thicker the layers of the mineral wool nonwoven fabric the higher is the relatively difference in pressure between suction device and the nonwoven surface. This can be counteracted by increasing the suction capacity, but this has the disadvantage that, on the one hand, the energy consumption is increased and, on the other, the lower portions of the mineral wool nonwoven fabric are compressed to such an extent that the mineral wool nonwoven fabric leaves the shroud already precompacted. Such a density gradient within the thickness of the insulant is undesirable since this reduces the insulance and other quality data such as e.g. pliancy and compressive stress of the product.

To obtain a bulk density distribution across the thickness of the product which is as even as possible the thickness of the raw nonwoven upstream of the curing oven needs to correspond to at least twice the product thickness.

It is known from experience that the thickness of the raw nonwoven upstream of the curing oven considerably effects the density distribution and thus the pliancy of compressed products.

Prior art attempts of reducing the density gradient across the thickness of the insulant involved directing an air flow firstly from the bottom upwards in the drying oven configured as a circulating air oven so as to loosen up the higher density lower layers.

Proposed in German patent 39 21 399 is an apparatus in which the collection conveyor is configured so that the carrying surface area of the collection conveyor increases in each case in the conveying direction. This is achieved by inclining the collection conveyor from the horizontal so that the suction surface area is increased and a lower vacuum is needed in this zone.

EP 0 406 107 too, describes one such method for depositing fibers generated by a plurality of fiberizing means. In this arrangement each fiberizing means has its own interceptor zone and the intercepted fibers are discharged from the interceptor zone by conveyor belts. The web of the conveyor belts is convex and the surface areas of the interceptor zones become larger with increasing surface area weights on these conveyor belts. The disadvantage of such an apparatus is that the rotary walls surrounding the shroud in this system are not configured down to the conveyor belts, thus resulting in leakages which increase the blower capacity needed. This is why a fixed wall section adjoins the rotary walls downwards. These fixed sidewalls result in the product being more exposed to dirt which tends to collect in these areas to then periodically drop onto the conveyor belt located underneath. This has the further disadvantage that these random dirt droppings negatively effect the consistent quality of the resulting product.

In addition there is an optimum to the spacing between the fiberizing means and the collection conveyor. If the spacing is too small, strong horizontal air flows materialize on the collection conveyor which tend to roll up the deposited fibers into bundles. If the spacing is too large largish bundles of fibers (also termed hanks) tend to already form in the collection shroud which likewise render the product inhomogenous.

To minimize both effects a precise spacing as calculated or obtained from trial and error needs to be maintained between fiberizers and collection conveyor.

U.S. Pat. No. 4,463,048 describes a method and an apparatus for producing mineral wool nonwovens comprising several fiberizing units which deposit the fibers as a primary nonwoven on a collection conveyor which conveys horizontally in the region of the fibers being deposited. The conveyor belts of the collection conveyor are then guided over guide pulleys so that a secondary nonwoven materializes from two primary nonwovens. Since two primary nonwovens having half conveyor contact are generated the resistance coefficient in the throughflow of the primary nonwovens is roughly half that for a secondary nonwoven twice as thick, enabling the vacuum needing to be applied by the blower to be reduced roughly by 50%. However, the various fiberizing means need to be set very precisely to minimize the differences in density due to the transverse distributions. Setting the fiberizing means with high accuracy is also important to minimize the property differences, especially as regards their symmetrical distribution across the thickness of the secondary nonwoven.

Described in U.S. Pat. No. 4,917,750 is an apparatus and a method in which the mineral wool nonwoven fabric is sliced along a generally horizontal plane prior to entering a curing oven. The upper section is compressed and subsequently redeposited on the lower section so that the resulting mineral wool product has density distribution across the thickness, whereby the upper portion has a higher thickness than the lower portion located thereunder. The slice through the mineral wool nonwoven fabric is made in a substantially horizontal plane, parallel to the transport belt.

Known from U.S. Pat. No. 3,824,086 is producing a very thick mineral wool nonwoven fabric in making use of various fiberizing means. In this arrangement each of the individual fiberizing means deposits on an individual conveyor belt assigned to it. The individual mineral wool sections thus produced are subsequently deposited on each other.

SUMMARY OF THE INVENTION

The invention is based on the object of improving an apparatus and a method for producing a mineral wool nonwoven fabric so that a product having enhanced properties can be produced with low energy consumption.

The substantial feature of the mineral wool blanket or mineral wool mat is that two layers in each case feature identical properties as regards fiber quality and/or binder content. As already explained above, each single fiberizing means produces two layers in the secondary nonwoven which are in addition symmetrical as regards the plane of symmetry running parallel to the top and bottom side of the mineral wool product, thus permitting a finer graduation of the density distribution than hitherto possible in prior art. In this context it is understood that identical properties are properties which deviate only slightly for a single fiberizing means whilst the term "fiber quality" identifies both fineness and length of fiber responsible for the mechanical properties of the corresponding insulants.

The gist of the invention is based on providing a double-width shroud requiring a lower blower capacity since a mineral wool nonwoven fabric having half the unit weight is deposited in each case of the conveyor means. Fiber fineness and unit weight dictate the flow resistance of the raw nonwoven. In addition a means is provided for slitting the blanket of insulant into two blankets. From the double-wide designed shroud producing a mineral wool blanket having twice the width of that of the desired product, two separate mineral wool blankets are obtained, each of which has the width as required for producing the desired product. To marry the two blanket sections a conveying device is used which is able to guide the first blanket section so that it is deposited on the second blanket section.

Since the conveying distances of the generated blanket sections differ in length, fluctuations in the transverse distribution and fiber distribution of the mineral wool blanket generated in the shroud, as well as fluctuations in density are equalled out. To achieve this advantage even minor differences in the length of the conveying distances are sufficient, preferably greater than or equal to the fiberizer spacing in the shroud.

One substantial advantage of the apparatus in accordance with the invention is that two layers per fiberizing means are generated in the secondary nonwoven, meaning that the properties of the product are generated more symmetrically whilst significantly simplifying the setting between several fiberizing means. When, for example, as in U.S. Pat. No. 4,463,048 or, however, also in DE 39 21 399 C2, secondary nonwovens are produced from two primary nonwoven deposits, the skins of the secondary nonwoven are generated by various fiberizing means. This means that two different fiberizing means need to be set so that the fiber qualities, i.e. fiber fineness and length are practically the same, whereas in the apparatus in accordance with the invention two separate layers are formed in each case in the secondary nonwoven by one and the same fiberizing means and the two layers are arranged in each case in the product so that they are arranged symmetrical to the centerplane running parallel to the top and bottom side of the product.

In addition, the transverse distributions of individual fiberizing means are equalled out. Experience has shown that products of poor quality usually exhibit inadmissibly high transverse distributions of the discharged fiber quantity. Such transverse distributions are equalled out in the apparatus in accordance with the invention as explained in detail below.

Although in the double-wide shroud a mineral wool nonwoven fabric is produced having a lower unit weight and thus also exhibiting a low density gradient across the thickness of the mineral wool nonwoven fabric, it can never be excluded with absolute certainty that density gradients occur in conventional production of mineral wool nonwoven fabric in making use of a shroud above a conveyor means. As explained above, the density is highest at the underside of the mineral wool blanket. Despite this increase in density having the disadvantage that the heat insulating properties relative to the mass are diminished in this portion, these portions of higher density have the advantage of improved stiffness.

By inverting the first blanket section as preferred the first blanket section and second blanket section are married so that the corresponding higher density portions are located at the top and bottom of the blanket thus enabling products to be achieved having an enhanced dimensional stability for a low average density of the mineral wool blanket and the associated good insulating properties.

The apparatus in accordance with the invention has in addition the advantage that existing shrouds can be easily retrofitted. Since a usual conveyor means is arranged at the bottom of the shroud, whose distance from the fiberizing means is predefined, the fabricated raw nonwoven leaves the shroud level with the adjoining production line. When, instead, prior art drums or conveyor means at the bottom of the shroud are retrofitted the raw nonwoven leaves the system at a significantly lower level and thus first needs to be returned to the production line. However, the simple configuration of the shroud has, in addition, the advantage that any dirt collecting in the region of the conveyor means does not result in the product being contaminated.

With the apparatus as well as in making use of the method in accordance with the invention a blanket or mat of mineral wool can be produced from homogenous mineral wool fibers which has a density distribution across the thickness of the mineral wool blanket, it being understood in this context that the thickness is the dimension extending perpedicular to the width and also to the length of the mineral wool blanket fabricated and accordingly also perpedicular to the top and bottom of the mineral wool mats fabricated. In this arrangement the density distribution is configured so that in a smooth profile of the density across the thickness of the mineral wool product a higher density in the lower portion of the mineral wool product is initially continually diminished before then translating into a substantially continual portion in the middle and then continually increasing again in the upper edge portion to achieve a maximum value at or near to the top edge corresponding to the maximum value at or near to the bottom edge. This characteristic density distribution of the mineral wool product makes is easier to process due to the enhanced dimensional stability near to the top and bottom side whilst ensuring good heat insulating properties due to the even density in the middle portion. The desired uniform density across the thickness of the product is positively influenced by the staggered pile of the two blankets. In addition any asymmetrical fiber distribution problems can be offset by piling the two blankets, resulting in better mechanical properties of the product for the same average bulk density.

The substantial feature of the mineral wool blanket or mineral wool mat is that two layers in each case feature identical properties as regards fiber quality and/or binder content. As already explained above, each single fiberizing means produces two layers in the secondary nonwoven which are in addition symmetrical as regards the plane of symmetry running parallel to the top and bottom side of the mineral wool product, thus permitting a finer graduation of the density distribution than hitherto possible in prior art. In this context it is understood that identical properties are properties which deviate only slightly for a single fiberizing means whilst the term "fiber quality" identifies both fineness and length of fiber repsponsible for the mechanical properties of the corresponding insulants.

The dimensional stability of the products depends not only on the bulk density but also on the binder content. Since a high binder content in the product has a negative effect on the fire resistance properties it is very important to restrict the portion of high binder content to the necessary edge zones. This effect too can be set particularly well by the arrangement as described. Since only one fiberizer forms each surface of the product, the portion of high binder content as well as portions differing in fiber quality, e.g. longer or finer fibers, can be set substantially more accuracy than in all other prior art devices a methods of production.

Preferred embodiments of the invention are characterized by the remaining claims.

In accordance with one preferred embodiment the means for slitting the insulant blanket generates a water cutting jet which can be directed at the insulant blanket. Making use of a water cutting jet has proven to be particularly more favorable than other cutting means, for example in the form of circular saws. In the region where it is parted the insulant blanket is still to harden and aggregate with the binder still tacky so that making use of such a water knife has the great advantage that working items used in parting cannot become stuck or detrimented. In addition densification of the nonwoven at the cut edge is avoided.

An alternative means for slitting the insulant blanket uses a laser beam.

When a high output is required several fiberizing means may be arranged staggered in both the conveying direction of the conveyor means and transversely to the conveying direction of the conveyor means.

In accordance with another preferred embodiment the conveyor means comprises for inverting the first blanket section an inverter pulley about which the first blanket section can be guided. This represents the simplest solution technically for inverting the first blanket section in accordance with the invention prior to it being deposited on the second blanket section. Due to the good coherency of the fabricated mineral wool blanket there is no risk of the produced mineral wool nonwoven fabric tearing in passing it about an inverter pulley, this being the reason why there is no need for further complicated technically means.

In accordance with yet another preferred embodiment the conveyor means of the primary nonwoven in the shroud is located substantial perpedicular to the conveying direction of the secondary nonwoven. This facilitates retrofitting existing production systems with minimum downtime by the preparatory work as regards the fiberizing means, shroud the most of the conveyor means required being implemented on an existing linear production line parallel to on-going operation.

Preferably the difference between the conveying distance of the first blanket section to the conveying distance of the second blanket section equals or exceeds the spacing of the fiberizing means. This simple geometry definition effectively assists compensating existing transverse distributions of the fiberizing means by a sufficiently high difference in the conveying distances being made available so that the maldistribution effects of the bulk densities of a single fiberizing means cannot accumulate undesirably.

With the method and apparatus in accordance with the invention mineral wool products can be produced which exhibit an average density of but 4 to 11 kg/m$^3$, preferably 6 to 9 kg/m$^3$. In addition a secondary nonwoven can be fabricated which already has mechanical properties prior to entering the curing oven so that it is not compressed in the thruflow of the curing oven. In the curing oven the secondary nonwoven runs between an upper belt and a lower belt as a result of which the thruflow of the drying air is zoned from top to bottom and bottom to top. It is usually so, due to the flow resistance of the nonwoven (product) in a bottom to top thruflow, that an air cushion is formed between the lower belt and the product whilst in the region of the upper belt hardening of the product already takes place to consolidate the product relative to its thickness. Subsequent thruflow of the curing oven from top to bottom then results in an air cushion being formed between the mineral wool product and the upper belt so that the product leaves the curing oven 20 mm to 40 mm less thick than the spacing between upper belt and lower belt. The raw and secondary nonwoven in accordance with the invention has such high mechanical properties that it is not compressed in the thruflow of the curing oven.

BRIEF DESCRIPTION OF THE DRAWINGS

The invention will now be detailed purely by way of example with reference to the drawings in which.

WAYS OF IMPLEMENTING THE INVENTION

Figure 1:
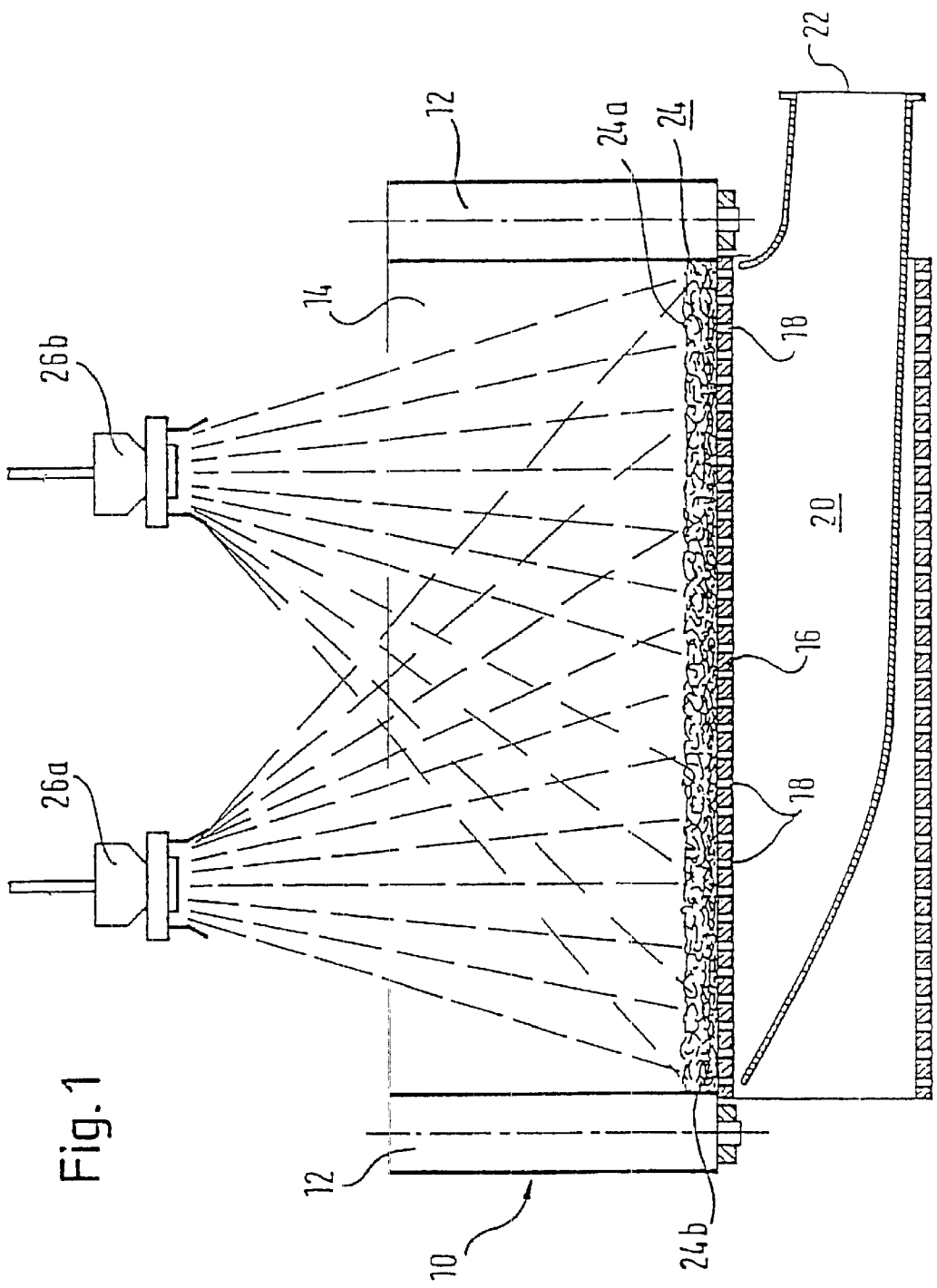
FIG. 1 is a section view perpendicular to and along the conveying direction of a shroud including two fiberizing means arranged transversely staggered to the conveying direction.

It is to be noted that like or similar elements are identified by like reference numerals.

Referring now to FIG. 1 there is illustrated a section view through a shroud, the section line running in a vertical plane perpendicular to the direction in which the mineral wool blanket is discharged from the shroud. The shroud 10 consists of walls 12 as well as a front wall (not shown) and a rear wall 14. These walls define the shroud with a substantially rectangular cross-section. Preferably the walls 12, 14 are located around rotatable rollers and execute a movement about the complete shroud 10 or sectionwise about portions of the shroud so that the walls pass perpendicular scrapers arranged outside of the shroud for removing any mineral wool fibers sticking to the walls of the shroud. The precise geometry and configuration of the shroud is, however, not decisive to the gist of the invention; it merely being important that the rotating walls of the shroud 12, 14 are sealed off well from the fiber conveyor means to prevent any additional leakages into the shroud.

Figure 1A:
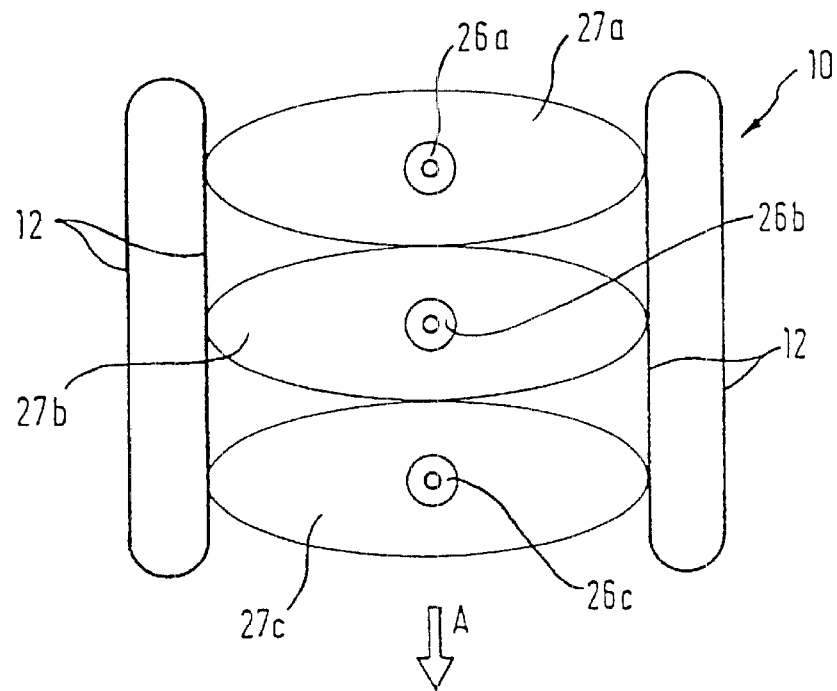
FIG. 1a is a plan view of the shroud including fiberizing means arranged in the conveying direction of the shroud.
Figure 1B:
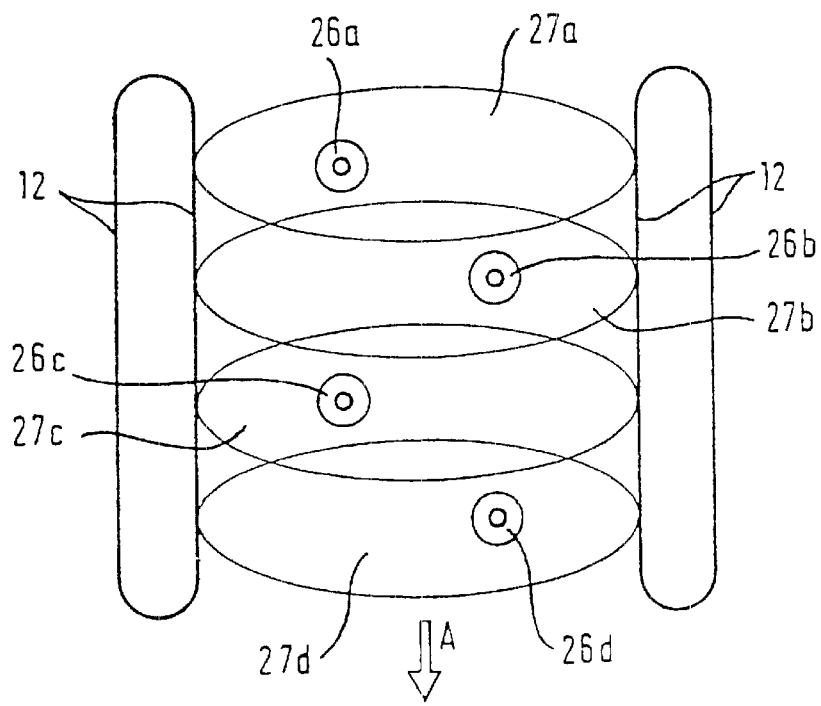
FIG. 1b is a plan view of the shroud including fiberizing means arranged staggered both transversely to and along the conveying direction.

The conveyor means consists of a pallet conveyor belt 16 provided to run around suitable drive pulleys or idlers in executing a transverse distribution in the plane of the drawing as shown in FIG. 1 or in the direction of the arrow A in the FIGS. 1a and 1b. The conveyor belt 16 is an endless belt having perforations 18 through which the air can be suctioned through the conveyor belt.

For suctioning a suction orifice 22 as shown schematically serves which is located in a vacuum chamber 20. The vacuum chamber 20 is connected to a suitable blower which in operation draws air from the vacuum chamber 20 and exhausts it from the region of the apparatus. When the blower connected to the suction orifice 22 is in operation the air flows through the perforations 18 in the conveyor belt 16 into the vacuum chamber from which it is expelled. This results in a low vacuum being produced in the region of the primary nonwoven 24 located on the conveyor belt 16, as a result of which the fibers located on the conveyor belt 16 are maintained composited as the mineral wool blanket.

The thicker the primary nonwoven 24 the higher is the loss in pressure through the mineral wool blanket so that the capacity of the blower connected to the suction orifice 22 needs to be selected correspondingly higher. This needs to be set according to the topmost layer 24a of the primary nonwoven 24 since the fibers in the layer 24a too are to be prevented from being undesirable blown upwards in the direction of the fiberizing means. The return flow in the shroud materializes due to the molten glass being centrifuged from a perforated spinner disk into primary threads which are subsequently drawn into fine fibers downwards through an annular natural gas-heated burner in conjunction with an annular compressed air nozzle, thus producing a substantial air flow in the shroud which after impinging the conveyor means or the primary nonwoven deposited thereon produces a turbulent swirl and is partly returned upwards in the form of a return flow. This return flow may result in random conveyance of part of the generated mineral fibers, this being the reason why attempts are made to eliminate such return flows as best possible.

However, a certain return flow of fibers in the plenum of the shroud is desired to fluff the raw nonwoven and to achieve a better distribution of the returned edge strips. To avoid an undesirable degree of return flow a considerable blower capacity needs to be installed to exhaust the required processing air through the conveyor means. The higher the conveying capacity of the conveyor means for a given vacuum surface area the stronger the pressure acts on the lower layers of mineral fibers 24b, i.e. the layers in contact with the conveyor means 16, this being the reason why a higher density materializes in the lower layer 24b when the unit weight of the primary nonwoven 24 is too high and the high loss in pressure associated therewith.

In shrouds known hitherto (without pendulum depositer) a primary nonwoven is produced corresponding to the width of the final product. The "double-width shroud" has for like products and like fiberizing conditions the advantage that due to the double-width the unit weight is halved and in addition the air velocity in the primary nonwoven is reduced by 50% due to the double suction area. The pressure loss is given by the formula $$\Delta p = \xi \cdot \frac{\rho}{2} w^2$$

where $\xi$ is the resistance coefficient, $\rho$ the density of the suctioned air and w is the air velocity through the mineral wool nonwoven fabric. In the case of the double-wide shroud only half the air velocity w is needed in suction and in addition the raw nonwoven is halved due to the thickness of the primary nonwoven being halved. This produces a nonwoven of high pliancy due to the fibers being minimally mechanically loaded and breaking less because of the low vacuum. Furthermore, very low bulk densities in the range 4 to 11 kg/m$^3$ having very good heat insulating properties are achievable in this way.

Thus the average loss in pressure through the primary nonwoven in the "double-wide shroud" as compared to the standard normal-width shroud is but 12.5% (=⅛th) and as compared to a normal-width double drum shroud but 50% (=½) which apart from the greater raw nonwoven thickness also results in considerable savings in energy.

The two fiberizing means 26a and 26b as shown in FIG. 1 are arranged laterally staggered. Providing the fiberizing means 26a, 26b staggered permits particularly good control of the fiber distribution in the transverse direction.

The width of the shroud 10 as shown in FIG. 1 may be approx. 1.5 m or even more, it, of course, also being possible to arrange not only one but two or more fiberizing means juxtaposed.

The arrangement of the fiberizing means as shown in the sectional view of FIG. 1 corresponds to the arrangement in the plan view as shown in FIG. 1b. The fiberizing means 26a, 26b, 26c and 26d are arranged staggered both longitudinally and transversely in the direction of movement A of the conveyor means. Due to the air suction arranged under the air-permeable conveyor belt, fiber socks 27a to 27d are formed in each case despite the staggered arrangement of the fiberizing means producing a substantial symmetrically discharge of fabricated vitreous fibers in the portion as circumscribed schematically in FIGS. 1a and 1b.

As an alternative, however, the arrangement as shown in FIG. 1a is also possible in which the fiberizing means 26a to 26c are each arranged in the conveying direction of the conveyor means and thus parallel to the direction A.

The salient aspect of the shrouds as shown in FIGS. 1, 1a and 1b is that each has a width corresponding to the twice the width required for the product to be produced in the subsequent production line.

Figure 2:
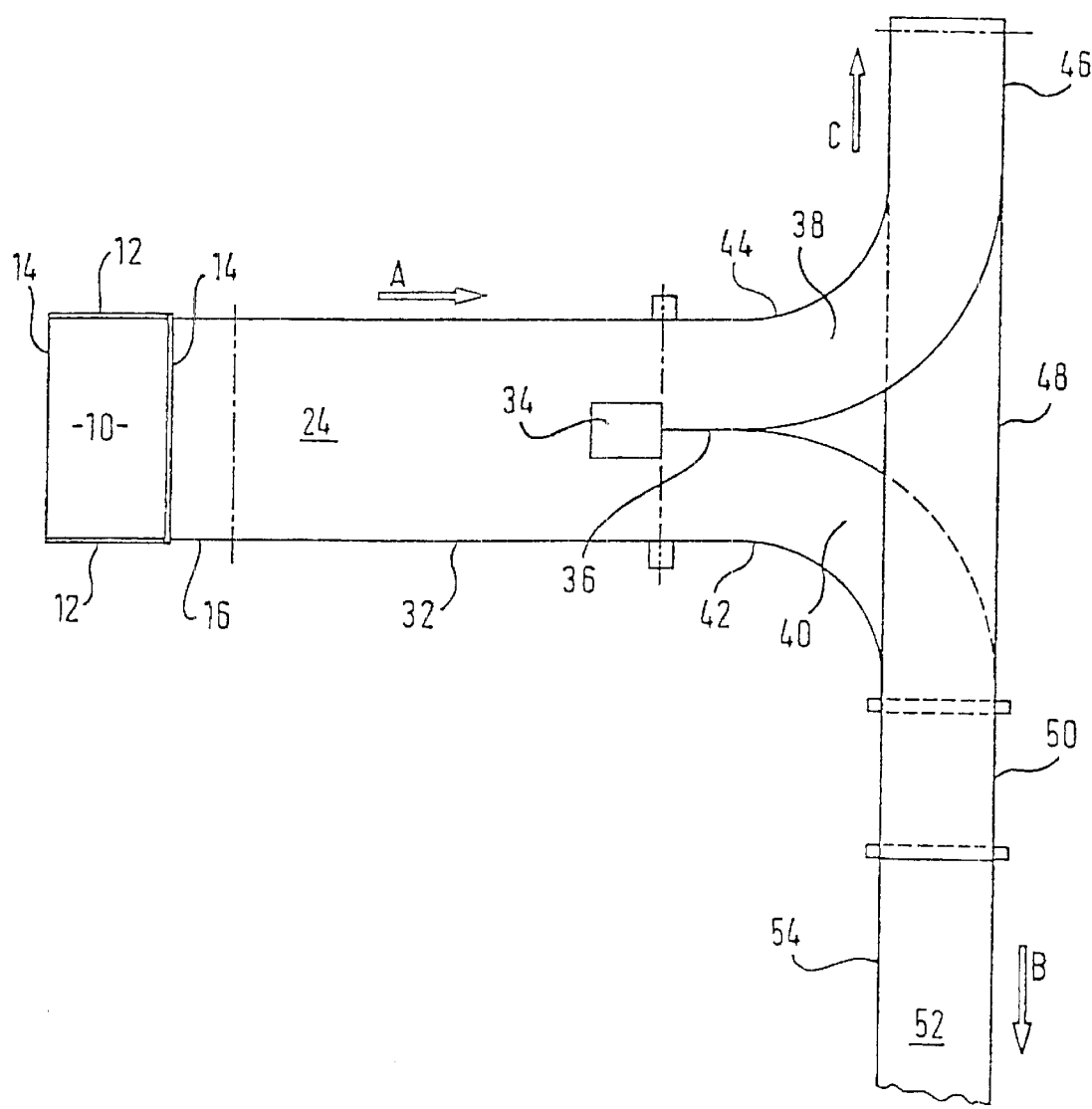
FIG. 2 is a plan view of the shroud as shown in FIG. 1 and also illustrating the adjoining conveyor means.

Referring now to FIG. 2 there is illustrated schematically the further processing of the primary nonwoven 24 indicated in the shroud 10 as shown in FIGS. 1, 1a or 1b. After leaving the shroud 10 represented schematically by the walls 12, 14 the primary nonwoven 24 is moved in the direction of the arrow A onto a conveyor means 32 following on from the conveyor belt 16. The conveyor means 32, like the shroud itself and also the conveyor means 16, is configured double-wide and runs at the same speed as the production line to be described later.

In describing the material flow, reference is made in the following to various conveyor means each adjoining the other. It is to be noted, however, that each of the portions in which the various conveyor means adjoin each other can be selected optionally and that means larger than those as described in the following are achievable. Selecting the individual conveyor means is governed by various practical considerations such as serviceability, the possibility on power up of setting a subsequent conveyor means into movement not before stationary conditions have materialized, and many more.

The double-wide primary nonwoven 24 is forwarded on a conveyor means 32 to a slitter 34 which slits the continually produced primary nonwoven 24 into two blanket sections 38 and 40. The slitter may be, for example, a highly concentrated jet of water at high pressure, although other solutions are known in prior art for parting the continually conveyed primary nonwoven 24 such as e.g. laser beam means or the use of a band or circular saw. As evident from FIG. 2 the slitter 34 produces a slit 36 in the primary nonwoven 24 which divides the primary nonwoven 24 into a first blanket section 38 and a second blanket section 40, each the same in width. The second blanket section 40 is moved on a conveyor means 42 which turns the second blanket section 40 through 90° to the original conveying direction as depicted by the arrow A until the second blanket section 40 runs in the direction of the arrow B. The direction of the arrow B indicates the direction of movement of the subsequent production line (not shown) in FIG. 2 which depending on the product desired further processes the mineral wool material in various subsequent steps in the process. The first blanket section 38 too is moved on a conveyor means 44, the first blanket section 38 also being deflected 90° to the horizontal until it runs in the direction C which is parallel to the direction of movement B but in the opposite direction. The conveyor means 42 and 44 employ conical rollers to deflect the conveyed blanket sections 38 and 40.

The first blanket section 38 then enters an inverter means 46. The inverter means 46 ensures that the first blanket section 38 is passed around a suitable return pulley so that it leaves the inverter means 46 in the same direction of movement B as the second blanket section. The inverter means 46 is evident in more detail from FIG. 3. In the example as shown in FIG. 2 the inverter means 46 is designed such that the first blanket section 38 is moved downwards by the conveyor means 44 so that the conveyor means 48 adjoining the inverter means 46 runs under the conveyor means 44.

The first blanket section 38 arrives finally at a further depositer 50 adjoining the conveyor means 48 which deposits the first blanket section 38 inverted in the inverter means 46 on the second blanket section 40. The secondary nonwoven 52 thus has in the zone 54 of the complete production means roughly twice the thickness and twice the unit weight than that of the primary nonwoven 24 produced in the shroud.

As explained above, in the shroud including a suction means, a primary nonwoven is produced having a density gradient across the thickness. In this arrangement the lower layer 24b as shown in FIG. 1 has a higher density than the layers of the primary nonwoven 24 located thereabove. By inverting the first blanket section 38 in the inverter means 46 and subsequently depositing the inverted first blanket section 38 on the second blanket section 40 a mineral wool blanket 52 (secondary nonwoven) materializes which has a sandwich structure, meaning that both the lower layer portion and the upper layer portion, both formed from the layers 24b of the produced primary nonwoven 24, exhibit a higher density and thus better dimensional stability. The sandwiched portion 56 has a lower density, but also lower dimensional stability without, however, having a negative effect on the properties of the product. On the contrary, the mass-related heat insulating value increases with reduced bulk density of the mineral wool product. A very similar distribution materializes as regards the binder content in the mineral wool product which is higher in the edge layers of the secondary nonwoven at or in the vicinity of the top side and underside of the portion 54.

A further advantage afforded by the invention is evident from FIG. 2. As already explained, the further production line runs in the direction B, i.e. at right angles to the conveying direction of the primary nonwoven from the shroud to thus facilitate retrofitting existing production means by merely requiring a suitable location to be created adjoining the production line.

Figure 3:
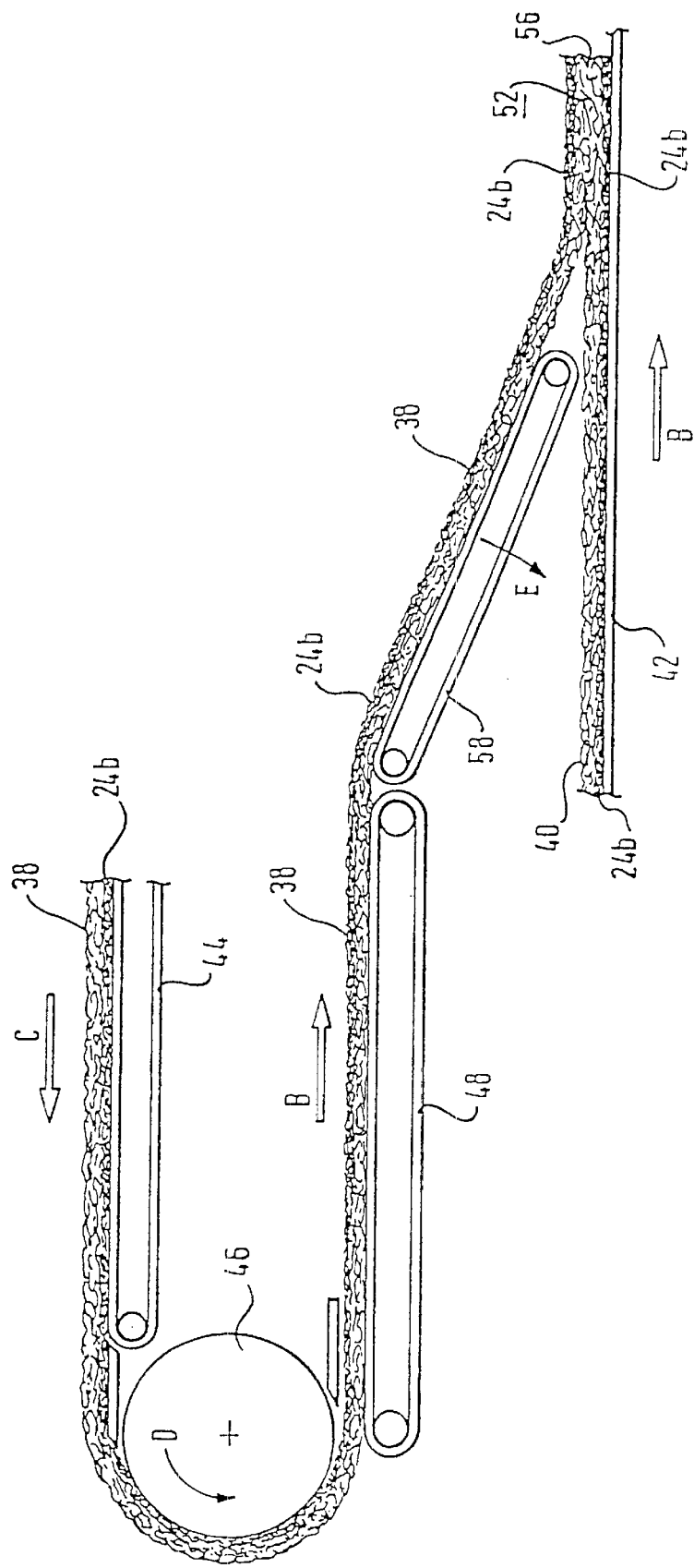
FIG. 3 is a schematic side view of the inverter means as well as how the insulant blankets are married.

Referring now to FIG. 3 there is illustrated a schematic side view of the means for inverting and marrying the insulant blankets. In this arrangement the view is shown in the direction of the arrow A in FIG. 2 and simplified by the curved conveyor means 38 and 40 adjoining the slitter 34 (see FIG. 2) being illustrated only in part.

From the position of the conveyor means 42 and 44 it already follows, however, that these are configured so that after parting of the primary nonwoven 24 in the slitter 34 and separate further conveyance of the first blanket section and second blanket section the difference in the two levels materializes as shown in FIG. 3. In this arrangement the first blanket section 38 is brought to a sufficient height about the second blanket section 40 so that the first blanket section can be inverted downwards about the inverter means 46 before being deposited on the second blanket section at a lower level.

As evident from FIG. 3 the inverter means 46 consists of a rotating roll powered in the direction of the arrow D by a suitable drive means so that its peripheral velocity corresponds to the speed C at which the first blanket section is conveyed on the conveyor means 44. The blanket section guided around the inverter means 46 is received by a conveyor means 48 arranged below and also evident from FIG. 2 and guided parallel to the second blanket section 40 but at a higher level in the direction of the arrow B. The conveyor means can be additionally run in the direction of the arrow A (see FIG. 1) to compensate any axial misalignment and to center the double-thick secondary nonwoven 52.

The first blanket section 38, now inverted, is then deposited on the second blanket section. For this purpose a further conveyor means 58 is provided adjoining the conveyor means 48 which takes over the first blanket section 38 and is swivel mounted in the direction of the arrow E to permit depositing the first blanket section on the second blanket section as precisely as possible even when insulant blankets differing in thickness are employed. The conveyor means 58 extends almost up to the surface of the second blanket section 40 and conveys the first blanket section on the second blanket section so that a secondary nonwoven materializes as mineral wool blanket 52 having twice the thickness as compared to that of the first and second blanket section as well as compared to the primary nonwoven 24.

The two blanket sections are joined homogenously since marrying as shown in FIG. 3 occurs prior to subsequent entry of the secondary nonwoven 52 into a curing oven in which the curing agent added in fiberizing, more particularly a phenolic resin, is cured, resulting in the mineral wool fiber composite.

Directing the flow of the first and second blanket section as shown in FIG. 3 with the movement of the return pulley 46 so that the first blanket section is conveyed inverted represents one variant in operation which is very simple to implement; it will readily be appreciated, of course, that it is just as possible to deflect the first blanket section upwards in creating the difference in levels subsequently required to place the first blanket section on the second blanket section by means of the conveyor means 58.

The advantage of the mineral wool blanket produced by the apparatus as described is that the portions 24b of higher density are arranged top and bottom in the mineral wool blanket 52 and result in a sandwich structure combining good dimensional stability and processing with a high insulance.

Another advantage lies in the fact that the first blanket section and second blanket section need to cover different distances before the two blanket sections are married. This has the advantage that mass distributions in the transverse direction (transverse distributions) of the fibers discharged by the fiberizing means occurring in the shroud can be compensated since local mineral fiber concentrations in the shroud equal each other out.

Figure 5:
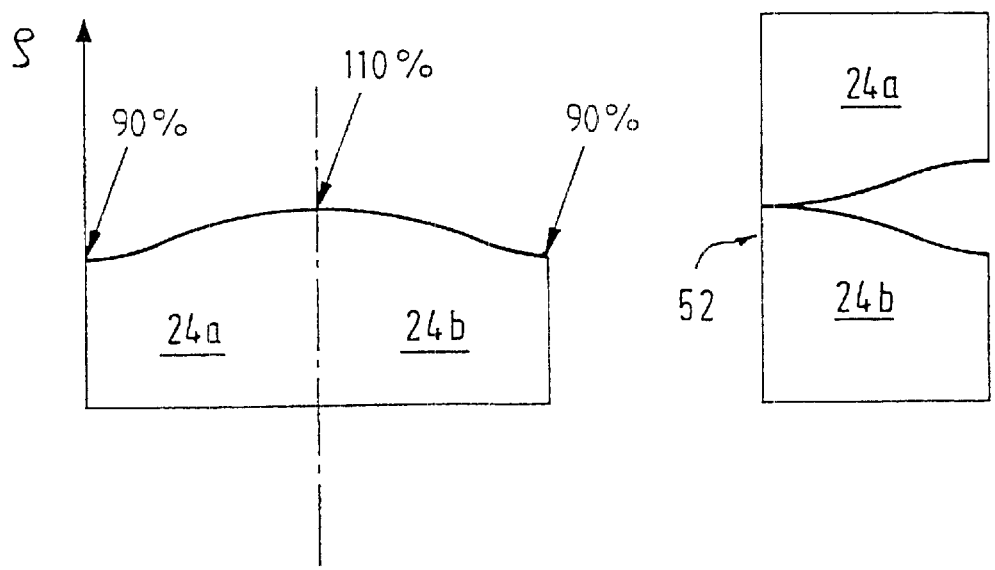
FIG. 5 are examples illustrating the transverse distribution of the fibers in the shroud.
Figure 5:
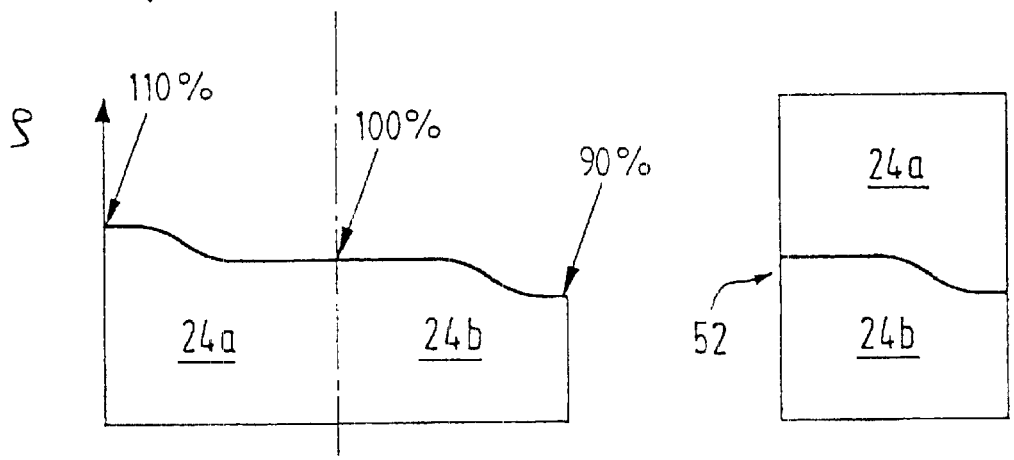

The transverse distribution, measured as a percentage relative to the average value, mainly dictates the product quality aside from fiber quality and binder content. A low bulk density of the blanket caused by the transverse distribution thus results in poor product quality. When the transverse distribution is set sufficiently precise the average bulk density can be reduced in maintaining all assured properties of the product. This will now be explained with reference to FIG. 5 illustrating examples of typical transverse distributions of the fibers in the shroud.

When the primary distribution is as shown in FIG. 5a, a transverse distribution of the fibers to the right/left in the shroud and thus bulk densities ρ materialize on the line corresponding percentually to the primary distribution so that there is no advantage to be had, when neglecting the compensating effect in staggering the blanket sections longitudinally.

A primary distribution of the bulk densities ρ as shown in FIG. 5b occurs particularly in the case of wide production lines and would precisely cancel each other out by the method in accordance with the invention and the apparatus in accordance with the invention as is evident from the illustrating of the mineral wool blanket slit in the middle and sandwiched as shown in FIG. 5b on the right.

Figure 4:
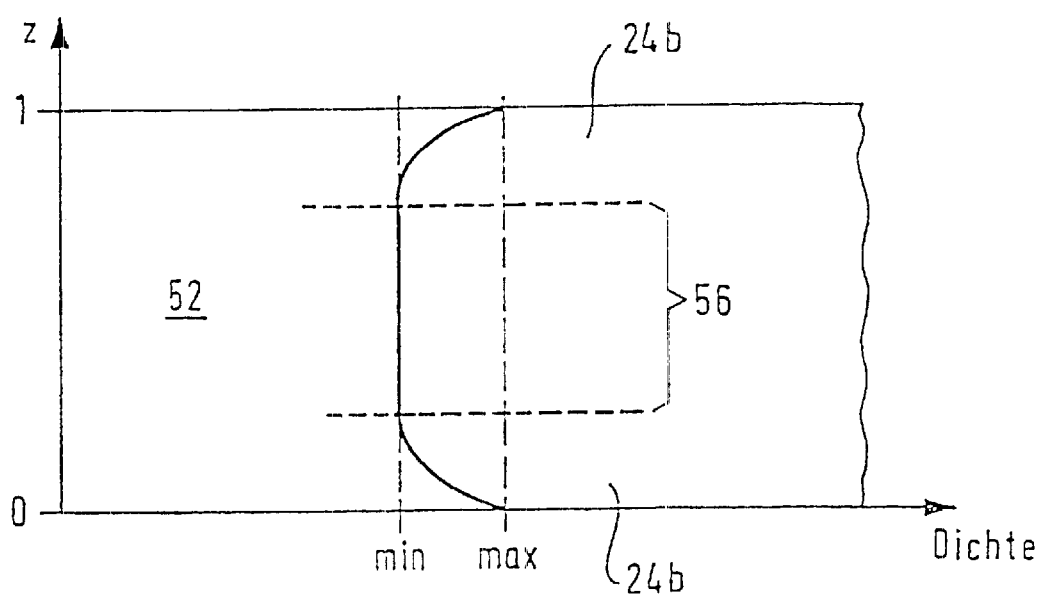
FIG. 4 is a diagrammatic illustration of the density distribution across the thickness of the mineral wool product fabricated by the apparatus in accordance with the invention or method in accordance with the invention.

FIG. 4 is a diagrammatic illustration of the density profile through the mineral wool product as fabricated, FIG. 4 plotting for this purpose the local density as a function of the scaled thickness z of the mineral wool blanket. As evident from the diagrammatic illustration in the upper portion and lower portion (z=1, z=0) the density is higher in each case and attains a maximum value max which is higher than the density value min existing in the middle portion 56 of the mineral wool blanket. As already explained in detail the majority of the fabricated mineral wool product has the homogenous density min ensuring good heat insulating properties and it is only in the edge portions of higher density as indicated diagrammatically by 24b up to the maximum value max and accordingly also higher binder percentages which endow the mineral wool product with a higher dimensional stability.

In accordance with a further embodiment of the invention a pendulum depositer may be additional made use of. This combination with a pendulum depositer enables a sandwich blanket of bulk felt to be deposited on a conveyor belt arranged at $90_i$ to the centerline of the shroud for a relatively low raw nonwoven thickness in the "double-wide shroud". With this system no limits are set any more to the unit weight of the products on the line.

With the aid of the apparatus in accordance with the invention and the method in accordance with the invention the transverse distribution on the line relative to the average value can be improved by approx. 3.5 to 4% as demonstrated by initial trial operation.

However, to improve the transverse distribution on the line relative to the average value to the value of approx. 3.5 to 4% gained in trial operation as cited above a sufficient longitudinally stagger needs to be provided in sandwiching the sections of the insulant blanket. An analysis of the primary distribution indicated that the transverse distribution can be improved only to half the value as cited above in a sandwich arrangement having no longitudinal stagger.

As likewise indicated in trial operation the vacuum required in the suction chambers was even lower than the values as precalculated. Having to change the transverse distribution as is often needed in changing products could be significantly reduced in the known embodiments. In addition no compression of the nonwoven due to the throughflow in the subsequent curing oven occurred due to the very high pliancy of the raw nonwoven even at bulk densities of 7 $kg/m^3$ and less.

Due to the improvement in the mechanical properties of the primary nonwoven the over-thickness on the line can be reduced to roughly half. The resulting higher bulk densities in the curing oven reduce localized compression of the product due to the throughflow. In the known embodiments the differences in the transverse distribution result in localized differences in thickness on the line in general, especially where low bulk densities are involved.

What is claimed is:

1. An apparatus for producing a mineral wool nonwoven fabric (52) comprising:

a shroud (10), comprising at least one fiberizing means (26, 26b); and a conveyor means (16) for transporting the produced mineral wool nonwoven fabric (24); said conveyor means being capable of guiding a first blanket section (38) so that said first blanket section (38) is deposited on a second blanket section (40) to produce a secondary nonwoven (52); the conveying distance of said first blanket section (38) being unequal to the conveying distance of said second blanket section (40), wherein a device (34) is provided for slitting said produced mineral wool nonwoven fabric in a longitudinal direction into the first blanket section (38) and the second blanket section (40);

said conveyor means including a conveyor portion (46, 48, 58) comprising an inverting pulley (46) about which said first blanket section (38) is guidable; said first blanket section (38) being inverted by said inverting pulley so that the underside of said first blanket section (38) is located upwards, the conveyor portion at the inverting pulley being of a first width;

the shroud (10) has a width at least twice the first width; and each of said at least one fiberizing means (26a, 26b) produces a mineral wool nonwoven fabric (24) forming two layers in the secondary nonwoven (52).

2. An apparatus according to claim 1, wherein said device (34) for slitting said produced mineral wool nonwoven (24) generates a water cutting jet directed at said mineral wool nonwoven fabric.

3. An apparatus according to claim 1, wherein several fiberizing means are arranged staggered in both the conveying direction of said conveyor means (16) and transversely to the conveying direction of said conveyor means (16).

4. An apparatus according to claim 1, wherein several fiberizing means (26a, 26b) are arranged in sequence in the conveying direction (A) of said conveyor means (16) of said shroud.

5. An apparatus according to claim 1, wherein said conveying direction (A) of said produced mineral wool nonwoven (24) in said shroud is substantially perpendicular to the conveying direction (B) of said secondary nonwoven (52).

6. An apparatus according to claim 1, wherein the difference between the conveying distance of said first blanket section (38) and the conveying distance of said second blanket section (40) equals or exceeds the spacing of said fiberizing means (26a, 26b).

7. An apparatus for producing a mineral wool nonwoven fabric, comprising:
   a shroud comprising at least one fiberizing means; and
   a first conveyor means for transporting the produced mineral wool nonwoven fabric,
   said first conveyor means being capable of guiding a first blanket section so that said first blanket section is deposited on a second blanket section to produce a secondary nonwoven,
   the conveying distance of said first blanket section being unequal to the conveying distance of said second blanket section, wherein
   a device is provided for slitting said produced mineral wool nonwoven fabric in a longitudinal direction into said first blanket section and said second blanket section,
   said first conveyor means includes a second conveyor means comprising, for inverting said first blanket section, an inverting pulley about which inverting pulley said first blanket section is guidable, said first blanket section being inverted so that the underside of said first blanket section is located upwards, and
   each of said at least one fiberizing means produces a mineral wool nonwoven fabric forming two layers in the secondary nonwoven.

8. An apparatus according to claim 7, wherein said device for slitting said produced mineral wool nonwoven generates a water cutting jet directed at said mineral wool nonwoven fabric.

9. An apparatus according to claim 7, wherein several fiberizing means are arranged staggered in both the conveying direction of said first conveyor means and transversely to the conveying direction of said first conveyor means.

10. An apparatus according to claim 7, wherein plural fiberizing means are arranged in sequence in the conveying direction (A) of said first conveyor means of said shroud.

11. An apparatus according to claim 7, wherein said conveying direction (A) of said produced mineral wool nonwoven in said shroud is substantially perpendicular to the conveying direction (B) of said secondary nonwoven.

12. An apparatus according to claim 7, wherein the difference between the conveying distance of said first blanket section and the conveying distance of said second blanket section equals or exceeds the spacing of said fiberizing means.

13. An apparatus for producing a mineral wool nonwoven fabric, comprising:
   a shroud of a first width and comprising at least one fiberizing means; and
   a first conveyor means for transporting the produced mineral wool nonwoven fabric,
   said first conveyor means being capable of guiding a first blanket section so that said first blanket section is deposited on a second blanket section to produce a secondary nonwoven,
   the conveying distance of said first blanket section being unequal to the conveying distance of said second blanket section, wherein
   a device is provided for slitting said produced mineral wool nonwoven fabric in a longitudinal direction into said first blanker section and said second blanket section,
   said first conveyor means includes a second conveyor portion comprising an inverting pulley about which inverting pulley said first blanket section is guidable and inverted so that said first blanket section is inverted so that the underside of said first blanket section is located upwards,
   said second conveyor portion having a second width at the inverting pulley, the first width being at least twice the second width, and
   each of said at least one fiberizing means produces a mineral wool nonwoven fabric forming two layers in the secondary nonwoven.

14. An apparatus according to claim 13, wherein said device for slitting said produced mineral wool nonwoven generates a water cutting jet directed at said mineral wool nonwoven fabric.

15. An apparatus according to claim 13, wherein several fiberizing means are arranged staggered in both the conveying direction of said first conveyor means and transversely to the conveying direction of said first conveyor means.

16. An apparatus according to claim 13, wherein plural fiberizing means are arranged in sequence in the conveying direction (A) of said first conveyor means of said shroud.

17. An apparatus according to claim 13, wherein said conveying direction (A) of said produced mineral wool nonwoven in said shroud is substantially perpendicular to the conveying direction (B) of said secondary nonwoven.

18. An apparatus according to claim 13, wherein the difference between the conveying distance of said first blanket section and the conveying distance of said second blanket section equals or exceeds the spacing of said fiberizing means.

* * * * *